United States Patent
Varykhalov

(10) Patent No.: US 12,379,335 B2
(45) Date of Patent: Aug. 5, 2025

(54) DEVICE FOR ROTATING A SPECIMEN ABOUT TWO ORTHOGONAL AXES

(71) Applicant: HELMHOLTZ-ZENTRUM BERLIN FÜR MATERIALIEN UND ENERGIE GMBH, Berlin (DE)

(72) Inventor: Andrei Varykhalov, Berlin (DE)

(73) Assignee: HELMHOLTZ-ZENTRUM BERLIN FÜR MATERIALIEN UND ENERGIE GMBH, Berlin (DE)

( * ) Notice: Subject to any disclaimer, the term of this patent is extended or adjusted under 35 U.S.C. 154(b) by 236 days.

(21) Appl. No.: 18/043,049

(22) PCT Filed: Aug. 26, 2021

(86) PCT No.: PCT/DE2021/100716
§ 371 (c)(1),
(2) Date: Feb. 27, 2023

(87) PCT Pub. No.: WO2022/042800
PCT Pub. Date: Mar. 3, 2022

(65) Prior Publication Data
US 2024/0027372 A1    Jan. 25, 2024

(30) Foreign Application Priority Data
Aug. 28, 2020 (DE) ...................... 10 2020 122 517.2

(51) Int. Cl.
*G01N 23/20016* (2018.01)

(52) U.S. Cl.
CPC .............................. *G01N 23/20016* (2013.01)

(58) Field of Classification Search
CPC .................................... G12B 5/00; G12B 1/00
See application file for complete search history.

(56) References Cited

U.S. PATENT DOCUMENTS

| | | | | |
|---|---|---|---|---|
| 3,564,240 A | * | 2/1971 | Thomas, Jr. ..... | G01N 23/20025 378/81 |
| 4,641,329 A | * | 2/1987 | Green .............. | G01N 23/20025 378/81 |

(Continued)

FOREIGN PATENT DOCUMENTS

| | | |
|---|---|---|
| DE | 10260058 | 7/2004 |
| DE | 102009001587 | 7/2010 |

OTHER PUBLICATIONS

Thomas Vosegaard et al. "A new goniometer design for single-crystal nuclear magnetic resonance spectroscopy", Review of Scientific Instruments 67, 2130 (1996), Published Online: Jun. 4, 1998 (Jun. 4, 1998).

(Continued)

*Primary Examiner* — David J Makiya
*Assistant Examiner* — Soorena Kefayati
(74) *Attorney, Agent, or Firm* — JMB Davis Ben-David

(57) ABSTRACT

Described herein is a device for rotating a specimen about two orthogonal axes independently, the device comprising at least the following components: a base, a socket which is arranged on the base and rotatable about a first axis, wherein the device further comprises a specimen holder which is arranged rotatably about a perpendicular second axis on the socket and wherein a center of a specimen receptacle at one end of the specimen holder coincides with an intersection of the first and the second axes, wherein the device further comprises a crank mechanism or a traversing winch for rotating the socket about the first axis, wherein another traversing winch having a linear transmission direction for rotation is arranged for rotating the specimen holder about the second axis.

7 Claims, 2 Drawing Sheets

(56) References Cited

U.S. PATENT DOCUMENTS

Figure 1:
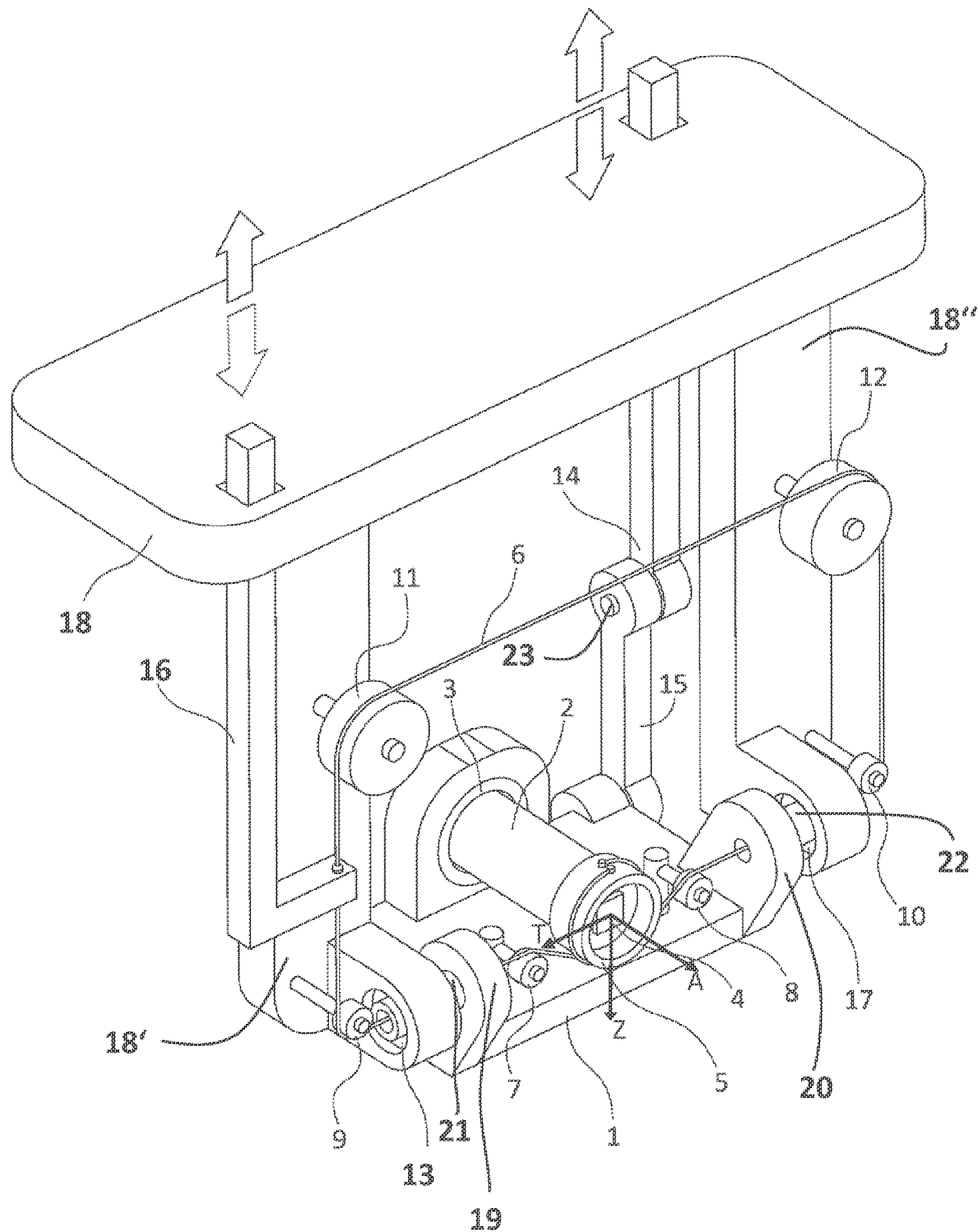

| | | | | |
|---|---|---|---|---|
| 5,127,039 | A * | 6/1992 | Hesch | G01N 23/20025 378/81 |
| 5,640,437 | A * | 6/1997 | Grueninger | G01N 23/2204 378/90 |
| 6,621,085 | B1 * | 9/2003 | Cipriani | G01N 23/20016 250/442.11 |
| 7,660,389 | B1 * | 2/2010 | Becker | G01N 23/20016 378/81 |
| 8,754,384 | B1 * | 6/2014 | Persoon | H01J 37/20 250/306 |
| 10,067,077 | B2 * | 9/2018 | Blank | H02N 2/0095 |
| 2002/0159560 | A1 * | 10/2002 | Nienaber | G01N 23/20 378/81 |
| 2005/0190881 | A1 * | 9/2005 | Obata | G01N 23/20016 378/87 |
| 2008/0173813 | A1 * | 7/2008 | Van De Water | G01N 23/04 250/311 |
| 2009/0262895 | A1 * | 10/2009 | Mettendorf | G01N 23/20016 378/79 |
| 2010/0322382 | A1 * | 12/2010 | Makarov | G01N 23/20025 378/208 |
| 2011/0211674 | A1 * | 9/2011 | Thorne | G01N 23/20016 378/81 |
| 2012/0074320 | A1 * | 3/2012 | Biberger | H01J 37/20 250/442.11 |
| 2013/0336454 | A1 * | 12/2013 | Nomura | G01N 23/20025 378/79 |
| 2015/0146859 | A1 * | 5/2015 | Kakefuda | G01N 23/207 378/75 |
| 2016/0189918 | A1 * | 6/2016 | Lai | H01J 37/228 250/311 |
| 2018/0330913 | A1 * | 11/2018 | Kataoka | H01J 37/20 |
| 2019/0178823 | A1 * | 6/2019 | Vukotic | G01N 23/207 |

OTHER PUBLICATIONS

J. Yao et al. "Design and construction of a triple-axis ultrahigh vacuum goniometer", Review of Scientific Instruments 69, 306 (1998); Published Online: Jun. 4, 1998 (Jun. 4, 1998).

* cited by examiner

DEVICE FOR ROTATING A SPECIMEN ABOUT TWO ORTHOGONAL AXES

CROSS-REFERENCE TO RELATED APPLICATIONS

This is the US National Stage of International Patent Application No. PCT/DE2021/100716 filed Aug. 26, 2021, which claims priority to German Patent Application DE10 2020 122 517.2, filed Aug. 28, 2020.

The invention relates to a device for positioning a specimen as used in particular in scientific instruments but also in industrial manufacturing.

In many fields of scientific characterization of samples or in machining of workpieces, it is required to translate a sample or a workpiece in the three spatial directions and to rotate it about the three spatial directions in order to set an advised orientation or to change the orientation during a scientific characterization or a machining, continuously or stepwise.

A sample means in the sense of the invention a substance, also to be addressed as material, which is to be sampled, i.e. to be characterized by means of scientific investigation procedures on certain characteristics. The sample can thus also be a component made of a material which is to be sampled or processed.

The translation along the three spatial directions is trivial and is realized by well-known devices, as they are used e.g. at optical microscopes or in CNC machines.

The rotation of a sample around the three spatial axes is realized in the scientific field especially by so-called goniometers. In paper 1 by J. Yao et al. (Design and construction of a triple-axis ultrahigh vacuum goniometer, Review of Scientific Instruments, Vol. 69, 1998, pp. 306-309), for example, a three-axis goniometer is disclosed and in paper 2 by T. Vosegaard et al. (A new goniometer design for single-crystal nuclear magnetic resonance spectroscopy, Review of Scientific Instruments, Vol. 67, 1996, pp. 2130-2133), for example, a two-axis goniometer.

Especially for applications in the scientific field, the requirements for goniometers are high. For example, they must be space-saving, suitable for high vacuum, and applicable in a wide temperature range, both in the cryogenic range (temperatures in the range of liquid helium) and the high-temperature range (up to 1000° C. and possibly higher). In addition—e.g. for the investigation of magnetic properties of a sample—the requirement can be added to exclude an input of electromagnetic fields, as it occurs e.g. by electric motors, for the samples to be investigated.

TASK OF THE INVENTION

The task of the invention is to provide a device for rotating a sample around two orthogonal axes, which makes it possible to rotate a sample simultaneously and independently of each other in three spatial directions without generating electromagnetic fields at the sample location. A further task is to design the device for use in high vacuum and in the low temperature range as well as for miniaturization.

The task is solved by the object of claim 1. Advantageous embodiments are the subject of the dependent claims.

The object of claim 1 relates to a device for rotating a sample about two orthogonal axes. This device comprises at least a base. The base can be realized by any object on which a socket, which is also at least comprised by the device, can be rotatably arranged. Such an object is realizable, for example, by a device for scientific characterization (e.g., a spectrometer), a cryostat or a workbench, or by reversibly attachable parts of the aforementioned devices. The base is, with respect to the device for rotating a sample about two orthogonal axes, the fixed element and not necessarily itself fixed with respect to a coordinate system external to the device.

The device further comprises at least a socket which is rotatably arranged about a first axis T of the two orthogonal axes at the base. This first axis T is in particular located outside (also to be called eccentric) the socket. The implementation in which the axis T is located outside the socket is advantageous because it simplifies the arrangement of all the components of the device. The eccentric arrangement or arrangement rotatable about an axis lying outside the socket is given by at least one step joint which is fixed to the base, i.e. not movable and in particular not rotatable, and to which a rotary axis is to be attached on the side facing away from the socket. The axis of rotation is given in particular by an axis rotatably mounted in the step joint or on the base, which is fixed to the base or the step joint. This axis defines the first axis T of the coordinate system. In an advantageous manner, a corresponding step joint is arranged on the opposite side of the socket, the axis of rotation of which coincides with the axis T. The axis T is always defined by the connecting line between the step joint and the base, regardless of its length.

For the rotation of the socket around the axis T, in a first embodiment, a mechanical means for the rotation of the socket around the axis T of the coordinate system is arranged, engaging the socket outside the area of projection of the axis of rotation onto the socket and whereas the rotation is performed by a deflection of the socket. In the first embodiment, this mechanical means for rotation is a crank mechanism as known from crank gears, e.g. from engine construction. The socket is deflected tangentially to the rotation about the axis T, so that the base rotates about this axis T when the crank drive is deflected by means of a push rod. The crank mechanism is actuated mechanically by the push rod. The effective lifting and thus the rotation caused is to be effected by adapted dimensioning. In this embodiment, the means for rotation about the axis T also serves to suspend or stabilize, in the sense of stabilizing with respect to rotation about the axis T, the socket.

A specimen holder is arranged on the socket. It is rotatable on the socket about a second axis A of the orthogonal coordinate system. In particular, the specimen holder is formed of a cylinder, wherein the cylinder axis forms the axis A and wherein a specimen receptacle is arranged at one end of the cylinder. The center of the specimen holder coincides with the axis T, so that the center of the specimen holder coincides with the intersection of the axis A with the axis T. The specimen holder is thereby arranged to rotate about the axis A, for example by means of a bearing which is mounted on the socket.

A mechanical means for rotation about the second axis A of the two orthogonal axes of the device is realized in particular by a first traversing winch. The two ends of a rope loop engage directly on the cylinder of the specimen holder or via an intermediate piece (sleeve on the cylinder) on the latter, so that the latter acts (indirectly or directly) as the winch of the traversing winch. The rope ends are attached to the winch in the zero position in such a way that they each span halfway around the winch in opposite directions, while being attached to the same length of the winch. The difference in the circumference of a loop, depending on the degree of winding on the winch, is to be compensated by a tensioner or a tensioning device, e.g. with spring force. In a third embodiment, the rope loop of the traversing winch is guided over at least three, in particular four, deflection pulleys, wherein at least two of the deflection pulleys are arranged in such a way that the loop (or the ropes) between these two deflection pulleys coincides with the axis T, and wherein in this embodiment the center of the winch coincides with the point of intersection of the axes A and T, i.e. also with the center of the specimen receptacle in the specimen holder. By pulling on the rope loop(s), the winch is rotated and consequently the specimen holder and a specimen therein. The rotation of the specimen holder thus has a linear transfer direction along the axis T, perpendicular to the axis A formed by the rope loop and its guide. This linear transmission direction, which remains locally unchanged by a rotation of the sample holder about the axis T and about the axis A, decouples the rotations about the two axes A and T, giving rise to an advantage of the invention. This decoupling means that the two axes A and T are always orthogonal to each other, regardless of the rotation. A further third rotation about a third axis Z is possible in a decoupled manner, in which the base or the device is correspondingly rotated about the axis Z as a whole and this rotation is thus also decoupled, in the sense that the orthogonal angle between the axes A and T and their orientation with respect to this axis Z is maintained during the rotation and a further orthogonal angle, for example between the axis T and the axis Z is also maintained. Advantageously, the axis Z is oriented so that it intersects with the axes A and T at their intersection.

For rotation of the socket about the axis T, in a second embodiment, a mechanical means for rotation is arranged at the end of the at least one step joint comprising the axis of rotation. The means thus directly engages the axis of rotation (axis T). This mechanical means of rotation is formed by a second traversing winch, the center of gravity of which coincides with the T axis. A traversing winch is a rope winch on which two ends of a rope loop or two ropes engage. In the zero position, the rope ends are attached to the winch in such a way that they each span half of the winch in opposite directions and are attached to the same length of the winch (see also above). The difference in the circumference of the loop, depending on the degree of winding on the winch, is to be compensated by a tensioner or a tensioning device, e.g. with spring force. The operation of a traversing winch can be readily understood with reference to FIGS. 1 and 2 of the embodiments and their description. In this embodiment, the second traversing winch also serves to suspend or support, in the sense of stabilizing with respect to rotation about the axis T, the socket.

The first and second traversing winches are each to be operated by means of an arm which is fixedly connected to the respective cable of the winch, i.e. the rotation is to be effected by moving the arm along the guide of the rope in the loop, whereby a pull is created on the rope loop or rope which rotates the winch. It is precisely a characteristic of traversing winches, which is used advantageously here, that the pull in one direction, e.g. imparted via the arm, has an equally opposite effect on the other direction, since the rotation of the winch in one direction, and thereby unwinding of the rope in this direction, always simultaneously causes the rope from the other direction to be wound up correspondingly on the winch, and this principle takes place symmetrically in both directions of rotation.

If the specimen holder and with it a specimen in the specimen holder is rotated about the axis A by means of the first traversing winch, this occurs independently of a rotation about the axis T, since the direction of transmission for the rotation of the mechanical means for rotation about the second axis A (which is the first traversing winch) coincides with the axis T. This principle, that the direction of transmission of the rotation about the axis A is along the axis T, allows the independent rotation about the two orthogonal axes A and T, since the rotations do not affect the right angle between the axes. The rotation about a third axis Z is performed by the rotation of the entire base or device, as it corresponds to a fourth embodiment. This rotation can be achieved, for example, by a rotatable bearing of the base.

This third rotation about the axis Z is carried out independently of the rotations about the axes T and A and, in particular, advantageously in such a way that the axis Z intersects the axes T and A at their point of intersection, so that all three rotations can also be carried out simultaneously, e.g. during an analysis of a sample in the sample holder, since the center of the sample holder does not shift and thus the respective rotations about one of the axes T, A and Z do not have to be taken into account in this respect.

Any torsion of the ropes of the second traversing winch during a rotation about the axis T is to be taken into account possibly during the selection of the ropes and is otherwise to be neglected.

In a fifth embodiment, the winch of the traversing winch is displaced along the cylinder and thus along the axis A. The loop of the second traversing winch is displaced parallel to the axis T up to the location of the winch by means of at least two additional deflection pulleys arranged on the base. The at least two additional deflection pulleys are arranged parallel to the axis T so that the ends of the rope of the rope loop end perpendicular to the axis A at the offset winch. The advantage of this embodiment is that the sample pick-up does not coincide with the location of the winch, thus simplifying sample change. The mode of operation remains unchanged, i.e. the rotations about the axes A and T continue to be independent and decoupled.

The advantage of using traversing winches also lies in the fact that, depending on the length of the loop, they can also be operated mechanically from a location relatively far away from the specimen holder. The traversing winches as well as the crank drive are made of materials that can be easily adapted for use in an intended temperature range. Also, the simple design can be miniaturized without major effort. The purely mechanical mode of operation in the vicinity of the sample holder, which minimizes the influence of electromagnetic radiation, can be operated outside of the base by electrical drives if these are shielded and/or far enough away.

EXAMPLES

The invention is explained in more detail below with reference to two figures and two examples.

The figures show:

FIG. 1 Schematic representation of the device according to the invention for rotating a sample about two orthogonal axes according to a first example.

Figure 2:
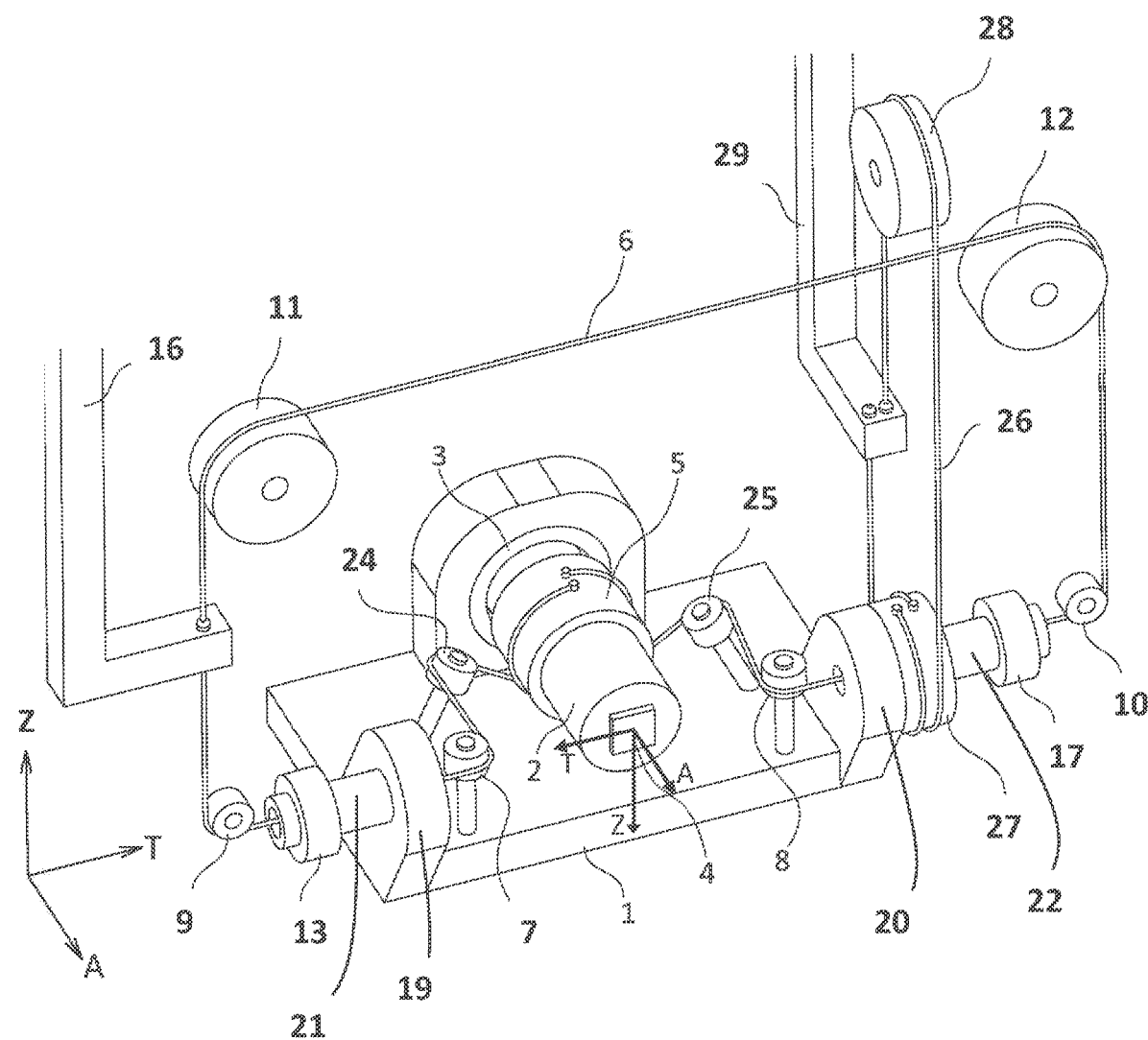

FIG. 2 Schematic representation of the device according to the invention for rotating a sample about two orthogonal axes corresponding to a second example.

A first example of a device according to the invention for rotating a sample about two orthogonal axes is given schematically in FIG. 1. Initially, the device comprises a base 18, 18', 18". The base 18, 18', 18" can thereby be arranged, for example, in a cryostat, a spectrometer or diffractometer for examining a sample. In the examples, the base is formed of a base plate 18 and two cantilevers 18', 18". Furthermore, the device comprises a socket 1. A mount 3 with a bearing for the sample holder 2 is arranged on the socket 1. The specimen holder 2 is cylindrical. The cylindrical axis of the specimen holder 2, about which it is also rotatable, forms the second axis A of the two orthogonal axes of the device. On one side, the specimen holder 2 has a specimen receptacle 4. On the same side of the specimen holder 2, a winch 5 is attached on the outside, which forms the winch of the first traversing winch and is firmly connected to the specimen holder 4. The center of gravity of the winch coincides with the axis A and the center of the specimen holder 4.

A first traversing winch serves as a mechanical means for rotation about axis A. The traversing winch is formed by a winch 5, on which two ends of a rope loop 6 engage. In the zero position (position in FIG. 1), the rope ends are attached to the winch 5 in such a way that they each span half of the winch 5 in opposite directions and are attached to the same length of the winch 5 (at the top of the winch in the figure). The difference in the circumference of the loop, depending on the degree of winding on the winch, is to be compensated by a tensioning device (not shown), e.g. with spring force. The rope loop 6 is guided in part perpendicular to the axis A by four deflection pulleys 7, 8, 9, 10, through which a section forming the axis T is formed. In the example, the deflection pulleys 7, 8, 9, 10 are arranged partly on the base 7, 8 and partly 9, 10 on the extensions of the base 18', 18". Further guidance of the rope loop is provided perpendicular to the axis T by two further deflection pulleys 11, 12, which are attached to the extensions 18', 18" of the base. The axis A and the axis T intersect at the center of the specimen holder 4.

This first traversing winch can be operated via an arm 16, which is firmly connected to the rope loop 6 of the traversing winch, in which the arm 16 is moved linearly and thus, in accordance with the mode of operation of the traversing winch, the winch 5 is rotated and thus also the specimen receptacle 4 and thus also any specimen located therein about axis A.

Furthermore, two step joints 19, 20 are arranged symmetrically on the socket 1, on the outside at a first end of the socket. At their ends pointing away from the socket, there are holes for the rope loop 6 of the first traversing winch to pass through along the axis T. Furthermore, at these ends, viewed from the socket, two outwardly pointing pipe pieces 21, 22 are fixedly arranged along the axis T, through which the rope loop of the first traversing winch is also guided. The pipe pieces 21, 22 are rotatably mounted on the two extensions 18', 18" of the base of the device, each in a bearing 13, 17. The socket 1 is thus eccentrically mounted for rotation about the axis T.

For rotation of the socket 1 about the axis T, in the first example the means for mechanical rotation about the axis T is formed by a crank mechanism. For this purpose, an arm (also addressable as a push rod) 15 is rotatably arranged at an end opposite the first end of the socket 1 at which the step joints 19, 20 are arranged, which in turn is connected to a push rod (also addressable as a piston rod) 14 via a joint (also addressable as a cross head) 23. Due to the linear movement of the push rod 14, the arm 15 is deflected and generates a thrust or lift on the socket 1, causing it to rotate around the axis T. The deflection of the socket 1 during rotation about the axis T is tracked by the connection of the articulated arm 15 to the push rod 14 via the joint 23. The whole is forming in summary a crank mechanism.

Due to the coincidence of a part of the guide of the rope loop 6 of the first traversing winch with the axis T and the fact that by means of the traversing winch a linear transmission direction for the rotation about the axis A of the sample holder 4 is effected via this part, the rotations about the axis A and those about the axis T are decoupled, which constitutes an advantage of the invention. This decoupling allows at the same time a decoupled rotation around the third axis Z. All three rotations about the axes A, T and Z of a sample in the sample holder 4, the center of which coincides with the intersection of the axes A and T and Z, can thus be carried out without moving the sample away from the center.

The coordinate systems shown in the figures correspond to the instantaneous orientation of the axes A, T and Z with respect to each other, as it corresponds to the state of the illustrated rotation. In both examples, the axis Z is advantageously oriented so that it intersects with the axes A and T at the same point.

According to the invention, no electric drive is required at the specimen location. All rotary movements can be mechanically imparted at the specimen location. The influence of electromagnetic fields is thus reduced. All parts of the device are to be made of materials which are suitable for high vacuum, low temperature and/or high temperature. In particular, the device is particularly suitable for the high vacuum region, since the feedthroughs into the high vacuum region for the rotations can be reduced to two.

A second embodiment of a device according to the invention for rotating a sample about two orthogonal axes is given schematically in FIG. 2. In FIG. 2, the base 18, 18', 18" formed by the base plate 18 and the two extensions 18', 18" is not shown for reasons of clarity. The means for mechanical rotation about the axis T is designed in the second example as a second traversing winch. The crank drive (14, 15, 23 in FIG. 1) is thus omitted. For this purpose, the winch 27 of the second traversing winch is firmly mounted on the tube section 22 through which a part of the rope loop 6 of the first traversing winch is guided. The rope loop 26 of the second traversing winch is tensioned via a deflection pulley 28. The second traversing winch is actuated in the same way as the first traversing winch via the displacement of an arm 29. Moreover, in contrast to the first example, in the second example the winch 5 of the first traversing winch is displaced on the cylindrical specimen holder 2. The rope loop 6 of the first traversing winch is diverted between the deflection pulleys 7 and 8 via the deflection pulleys 24, 25, so that the connecting distance between the deflection pulleys 24, 25 is perpendicular to the axis A. This offset of the winch 5 does not change the principle of decoupled rotation about the axes A and T, since furthermore between the deflection pulleys 9 and 7 and 8 and 10 parts of the rope loop on both sides of the winch 5, coincide with axis T.

The axes A, T and Z are also drawn in the figures for orientation.

The advantage of the invention lies in the decoupling of the rotations about the two orthogonal axes A and T of the device, and the extensive decoupling about a further axis Z. In addition, all rotations are to be effected mechanically. The traversing winches as well as the crank drive are to be manufactured from materials, which are easily adaptable to an application in an advised temperature range. Also, the simple design can be miniaturized without major effort. The purely mechanical action in the vicinity of the sample holder also minimizes the influence of electromagnetic radiation on a sample.

The invention claimed is:

1. A device for rotating a specimen about two orthogonal axes, comprising at least
   a base (18, 18', 18"), a socket (1) which is arranged on the base (18, 18', 18") and rotatable about a first axis, which lies in particular outside the socket (1), a specimen holder (2) which is arranged rotatably about a second axis on the socket (1) and wherein the second axis is oriented perpendicularly to the first axis and wherein a center of a specimen receptacle (4) at one end of the specimen holder (2) coincides with an intersection of the first and the second axes, mechanical means for rotating the socket (1) about the first axis, mechanical means for rotating the specimen holder (2) about the second axis, comprising a linear transmission direction for the rotation and wherein the linear transmission direction of rotation of the mechanical means for rotation of the specimen holder (2) about the second axis coincides with the first axis, wherein the mechanical means for rotation about the second axis is constituted by a first traversing winch (5, 6, 7, 8, 9, 10, 16).

2. The device according to claim 1, characterized in that the base (18, 18', 18") is rotatable about a third axis, wherein the third axis intersects with the first and the second axes at the same point.

3. The device according to claim 1, characterized in that a rope loop (6) of the first traversing winch (5, 6, 7, 8, 9, 10) is offset along the second axis by deflection pulleys (24, 25) parallel to the first axis.

4. The device according to claim 1, characterized in that the mechanical means for rotation about the first axis is constituted by a crank mechanism (14, 15, 23).

5. The device according to claim 1, characterized in that the mechanical means for rotation about the first axis is constituted by a second traversing winch (26, 27, 28, 29).

6. A device for rotating a specimen about two orthogonal axes, comprising at least a base (18, 18', 18"), a socket (1) which is arranged on the base (18, 18', 18") and rotatable about a first axis, which lies in particular outside the socket (1), a specimen holder (2) which is arranged rotatably about a second axis on the socket (1) and wherein the second axis is oriented perpendicularly to the first axis and wherein a center of a specimen receptacle (4) at one end of the specimen holder (2) coincides with an intersection of the first and the second axes, mechanical means for rotating the socket (1) about the first axis, mechanical means for rotating the specimen holder (2) about the second axis, comprising a linear transmission direction for the rotation and wherein the linear transmission direction of rotation of the mechanical means for rotation of the specimen holder (2) about the second axis coincides with the first axis, wherein the mechanical means for rotation about the first axis is constituted by a crank mechanism (14, 15, 23).

7. A device for rotating a specimen about two orthogonal axes, comprising at least a base (18, 18', 18"), a socket (1) which is arranged on the base (18, 18', 18") and rotatable about a first axis, which lies in particular outside the socket (1), a specimen holder (2) which is arranged rotatably about a second axis on the socket (1) and wherein the second axis is oriented perpendicularly to the first axis and wherein a center of a specimen receptacle (4) at one end of the specimen holder (2) coincides with an intersection of the first and the second axes, mechanical means for rotating the socket (1) about the first axis, mechanical means for rotating the specimen holder (2) about the second axis, comprising a linear transmission direction for the rotation and wherein the linear transmission direction of rotation of the mechanical means for rotation of the specimen holder (2) about the second axis coincides with the first axis, the mechanical means for rotation about the first axis is constituted by a traversing winch (26, 27, 28, 29).

* * * * *